United States Patent Office 2,993,061
Patented July 18, 1961

2,993,061
2,6-DIMETHYL-21-FLUORO-STEROIDS OF THE PREGNANE SERIES
Frank H. Lincoln and George B. Spero, Kalamazoo, William P. Schneider, Kalamazoo Township, Kalamazoo County, and John L. Thompson, Kalamazoo, Mich., assignors to The Upjohn Company, Kalamazoo, Mich., a corporation of Michigan
No Drawing. Filed Aug. 21, 1958, Ser. No. 756,316
1 Claim. (Cl. 260—397.45)

This invention relates to certain chemical compounds, more particularly to 2α,6α-dimethyl-11β,17α-dihydroxy-21 - fluoro - 4 - pregnene - 3,20 - dione, 2α,6α - dimethyl-17α - hydroxy - 21 - fluoro - 4 - pregnene - 3,11,20 - trione, 2α,6α - dimethyl - 9α - halo - 11β,17α - dihydroxy - 21-fluoro - 4 - pregnene - 3,20 - dione, 2α,6α - dimethyl - 9α-halo - 17α - hydroxy - 21 - fluoro - 4 - pregnene - 3,11,20-trione and certain intermediates in the production thereof, and the corresponding Δ¹-dehydro compounds. These compounds and a process for the production thereof are illustratively represented by the following formulae:

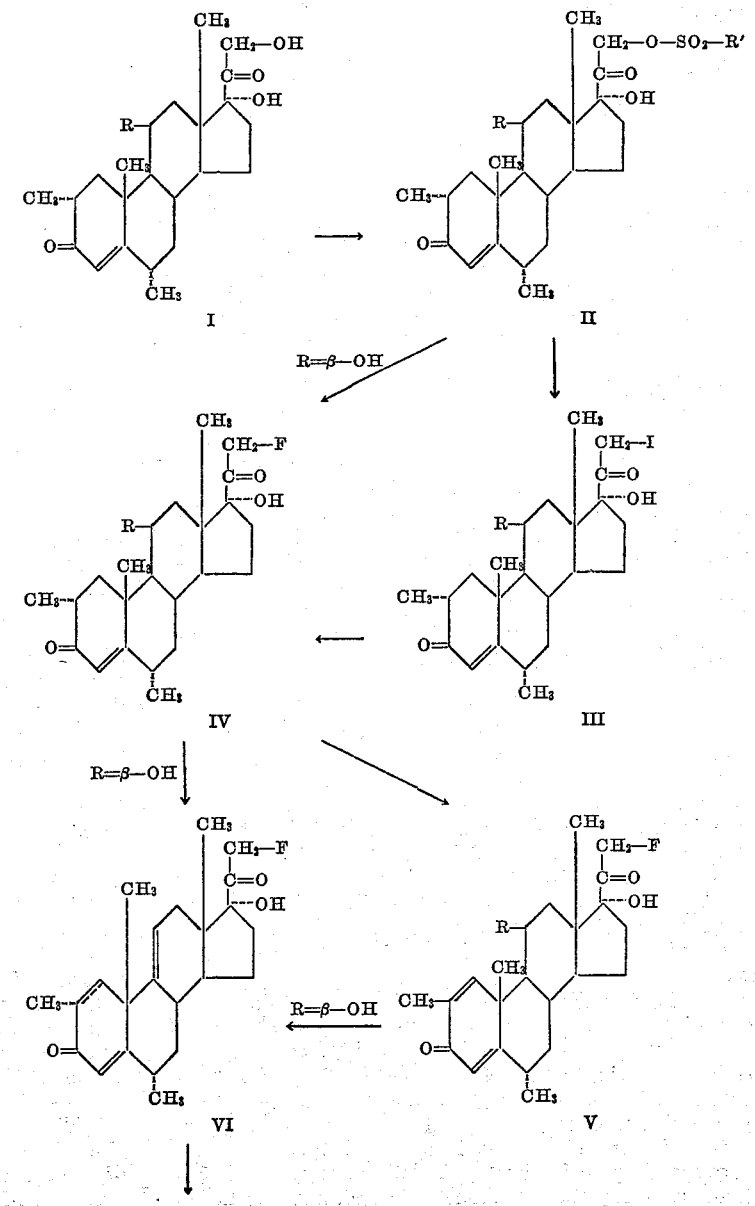

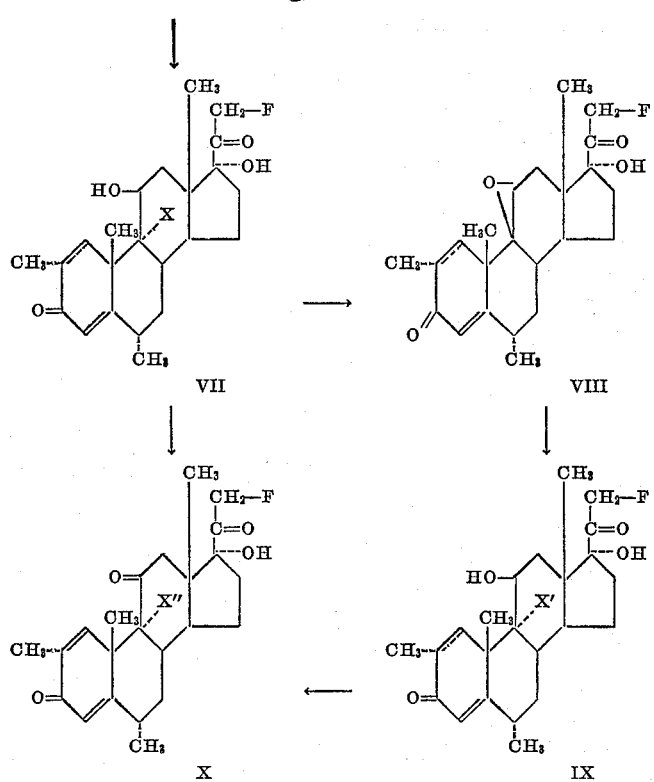

wherein R is keto or β-hydroxy, X is a halogen having an atomic weight from 35 to 120, inclusive, i.e., chlorine, bromine or iodine, X' is a halogen having an atomic weight from 19 to 36, inclusive, i.e., fluorine or chlorine, X" is a halogen atom, and R' is alkyl or aryl, e.g., a hydrocarbon radical preferably containing from one to twelve carbon atoms, inclusive. The dotted line in compounds VI—X is employed so that the formulae represent both the $\Delta^4$ and $\Delta^{1,4}$ compounds.

It is an object of the present invention to provide 2α,6α - dimethyl - 11β,17α - dihydroxy - 21 - fluoro - 4-pregnene-3,20 - dione, 2α,6α - dimethyl - 17α - hydroxy-21 - fluoro - 4 - pregnene - 3,11,20 - trione, 2α,6α - dimethyl - 9α,21 - difluoro - 11β,17α - dihydroxy - 4 - pregnene-3,20-dione and other 9α-halo compounds (VII, IX) 2α,6α-dimethyl - 9α,21 - difluoro - 17α - hydroxy - 4-pregnene-3,11,20-trione and other 9α-halo compounds (X) and intermediates in the production thereof (II, III, VI, VIII), and the corresponding $\Delta^{1,4}$-compounds. Another object is the provision of a process for the production thereof. Other objects will be apparent to those skilled in the art to which this invention pertains.

The novel compounds described and claimed herein possess valuable pharmacological activity, in particular mineralocorticoid, glucocorticoid, diuretic, and anti-inflammatory activities. They are useful as compositions or mixtures, e.g., as stable suspensions or in readily suspendible form to be injected for the treatment of rheumatoid ailments of the animal organism. These compounds can be administered orally or employed in topical preparations such as ointments, creams, and lotions for the treatment of inflammatory conditions of the skin, eyes, ears, etc.

Broadly described, the process of the present invention comprises treating a 2α,6α-dimethyl-11-oxygenated 17α,21-dihydroxy-4-pregnene-3,20-dione (I) with an organic acid sulfonyl chloride to give the corresponding 2α,6α-dimethyl-11-oxygenated-17α-hydroxy-4-pregnene-3,20-dione 21-organic acid sulfonate (II) thereafter heating the 21-organic acid sulfonate with an alkali metal iodide to obtain the corresponding 2α,6α-dimethyl-21-iodo-11-oxygenated-17α-hydroxy-4-pregnene-3,20-dione (III) and, finally, reacting the 21-iodo steroid or the 21-organic acid sulfonate with a metal fluoride fluorinating agent, e.g., potassium fluoride, silver fluoride, to yield the corresponding 2α,6α-dimethyl-21 - fluoro - 11 - oxygenated - 17α - hydroxy - 4 - pregnene-3,20-dione (IV, V). Oxidation of 2α,6α-dimethyl-11β,17α-dihydroxy-21-fluoro-4-pregnene-3,20-dione (IV), e.g., with chromic acid is productive of 2α,6α-dimethyl-17α-hydroxy-4-pregnene-3,11,20-trione (V). If desired, the iodination step can be eliminated by heating the sulfonate (II) with a potassium salt at high temperatures, e.g., at 100 to 130 degrees centigrade in dimethyl sulfoxide.

The novel 2α,6α - dimethyl - 11β,17α - dihydroxy - 21-fluoro-4-pregnene-3,20-dione (IV) of the present invention can be converted to other novel synthetic hormonal steroids possessing glucocorticoid and anti-inflammatory activity by the following reactions: Dehydration of 2α,6α-dimethyl - 11β,17α - dihydroxy - 21 - fluoro - 4 - pregnene-3,20-dione, for example, by reaction with a dehydrating agent, e.g., para-toluenesulfonic acid or alkylsulfonyl chloride in the presence of dimethylformamide, POCl₃ in pyridine, HCl in acetic acid, acetic or formic acid in the presence of BF₃, and N-haloamide or N-haloimide and SO₂ in pyridine, is productive of 2α,6α-dimethyl-17α-hydroxy-21-fluoro-4,9(11)-pregnadiene - 3,20 - dione (VI) which, when reacted with a molar equivalent of N-bromoacetamide in tertiary butyl alcohol under aqueous conditions and in the presence of perchloric acid catalyst, is converted to 2α,6α-dimethyl-9α-bromo-11β,17α-dihydroxy-21-fluoro-4-pregnene-3,20-dione (VII). Reaction of this latter compound with potassium acetate in acetone is productive of 2α,6α-dimethyl-9β,11β-epoxy-17α-hydroxy-21-fluoro-4-pregnene-3,20-dione (VIII). Addition of hydrogen fluoride to this compound, for example, with a methylene chloride solution of a molecular equivalent of more of hydrogen fluoride at minus fifteen degrees centigrade or in liquid fifty percent aqueous HF at room temperature, is productive of 2α,6α-dimethyl-9α-fluoro - 11β,17α - dihydroxy - 21 - fluoro - 4 - pregnene-3,20-dione (IX, X'=F). Substitution of hydrogen chloride at about zero degrees centigrade is productive of 2α,6α-dimethyl-9α-chloro-11β,17α-dihydroxy-21-fluoro-4-pregnene-3,20-dione (IX, X'=Cl). These latter two compounds, and especially the 9α-fluoro compound, possess an especially high order of glucocorticoid activity. Oxidation of these 9α-halo compounds (VII, IX), e.g., with chromic acid in acetic acid is productive of the corresponding 11-keto compounds (X).

2α,6α - dimethyl - 11β,17α - dihydroxy - 21 - fluoro-4-pregnene-3,20-dione (IV) and 2α,6α-dimethyl-17α-hydroxy-21-fluoro-4-pregnene-3,11,20-trione (V) and the 9α-halo derivatives thereof (VII, IX, X) and the intermediates in the production thereof previously described, can be transformed into their 1-dehydro analogues by subjection to the fermentative action of a 1-dehydrogenating fungus, e.g., of the genus Septomyxa, preferably *Septomyxa affinis*, more completely described as *Septomyxa affinis* (Sherb.) Wr, American Type Culture Collection 6737, a member of the class of Deuteromyces, Fungi Imperfecti. The 1,4-dehydrognated compounds thus-produced possess glucocorticoid activity and are useful in the treatment of rheumatoid and inflammatory diseases as they occur in the animal organism.

The 1-dehydrogenation of the novel 2α,6α-dimethyl steroids of this invention can also be effected chemically by the action of selenium dioxide under the conditions known to 1-dehydrogenate hydrocortisone or its 21-acylates.

The 1-dehydrogenation can be carried out under the conditions described in Belgian Patent 545,877, or German Patent 1,021,845. In general, the fermentation is carried out under submerged aerobic conditions in a medium containing the novel 2α,6α-dimethyl steroid in the presence of assimilable nitrogen, assimilable carbon and the necessary trace elements. The time of fermentation can be from eight to 72 hours, 24 hours being generally satisfactory, whereupon the resulting 1-dehydrogenated product can be recovered from the reaction mixture by the method disclosed in the aforementioned patents. Thus, 2α,6α-dimethyl-11β,17α-dihydroxy-21-fluoro-4-pregnene-3,20-dione, 2α,6α - dimethyl - 17α-hydroxy - 21 - fluoro - 4-pregnene-3,11,20-trione, 2α,6α-dimethyl - 9α - bromo - 11β,17α - dihydroxy - 21 - fluoro-4-pregnene-3,20-dione, 2α,6α-dimethyl - 9α,21 - difluoro-11β,17α-dihydroxy-4-pregnene-3,20-dione and 2α,6α-dimethyl - 9α,21 - difluoro - 17α - hydroxy - 4 - pregnene-3,11,20-trione are converted to 2,6α-dimethyl-11β,17α,-dihydroxy - 21 - fluoro - 1,4 - pregnadiene - 3,20 - dione, 2,6α - dimethyl - 17α - hydroxy - 21 - fluoro - 1,4 - pregnadiene-3,11,20-trione, 2,6α-dimethyl-9α-bromo-11β,17α-dihydroxy-21-fluoro-1,4-pregnadiene-3,20-dione, 2,6α-dimethyl - 9α,21 - difluoro - 11β,17α - dihydroxy - 1,4-pregnadiene-3,20-dione and 2,6α-dimethyl-9α,21-difluoro-17α-hydroxy-1,4-pregnadiene-3,11,20-trione, respectfully.

The starting 2α,6α-dimethyl-11-oxygenated-17α,21-dihydroxy-4-pregnene-3,20-diones (I) are prepared in accordance with the method of Hogg et al. as described in the Journal of the American Chemical Society 77, 6401 (1955). The starting steroid (I) is esterified with an organic sulfonic acid halide, preferably containing from one to twelve carbon atoms, inclusive, such as methanesulfonyl chloride, toluenesulfonyl chloride, benzenesulfonyl chloride, substituted benzenesulfonyl chloride, such as ortho-, meta-, or para-chlorobenzenesulfonyl chloride, the ortho-, meta-, or para-nitrobenzene sulfonyl chloride, benzenesulfonyl chlorides substituted by other halo, nitro, methoxy, ethoxy, and like groups, methanesulfonyl chlorine being preferred. The esterification is carried out in solution using pyridine or neutral solvents such as benzene, toluene, chloroform, or the like as the solvent. The organic acid-sulfonyl halide is usually employed in a ratio of one to 1.2 moles of organic sulfonyl halide to one mole of steroid. Smaller or larger proportions of reagent may be used and are operative but the ratio specified above is preferred. The organic sulfonyl chloride is generally added slowly to a reaction mixture consisting of the starting steroid dissolved in a non-reactive solvent, preferably pyridine, while stirring the reaction mixture and maintaining the same at reduced temperatures, such as for example, from about minus twenty to plus ten degrees centigrade. After the organic sulfonic acid halide has been added, the reaction mixture is refrigerated to between minus twenty and plus ten degrees centigrade for a period of between one and 48 hours. Thereafter the product, a 2α,6α-dimethyl - 11 - oxygenated - 17α,21 - dihydroxy - 4 - pregnene-3,20-dione-21-organic sulfonate (II) is isolated by conventional means, such as by pouring the reaction mixture into an excess of water, extracting with an organic solvent immiscible with water, e.g., benzene, chloroform, or methylene chloride, followed by drying the organic layer containing the steroid, evaporating the solvent therefrom and, if desired, purifying the residue, e.g., by crystallization or chromatography. For the subsequent reaction the 21-organic acid sulfonate can either be purified or used in the crude form.

The 21-organic acid sulfonate (II) is dissolved in an organic solvent, e.g., acetone, and then treated with an excess of alkali metal iodide, usually from two to five moles of sodium, potassium or lithium iodide per mole of steroid. The reaction mixture is heated with constant stirring for a period of from five to sixty minutes and is then evaporated at reduced pressure. The thus-obtained 21-iodo steroid (III) can be employed in the subsequent reaction either in the purified form obtained by crystallization, or it can be used in the crude state.

The 21-iodo steroid (III) dissolved in an inert solvent, e.g., dimethyl sulfoxide, acetonitrile, dimethyl-formamide or ethylene glycol is treated with silver fluoride, antimony fluoride, sodium fluoride or the like, acetonitrile and silver fluoride, respectively, being preferred. The alkali halide is preferably added in small portions at a time and the reaction mixture is preferably protected from light during the reaction period, which usually ranges from one-half to six hours. The reaction mixture is then concentrated and the product extracted as in the previous steps to yield essentially pure 2α,6α-dimethyl-11-oxygenater - 17α-hydroxy-21-fluoro-4-pregnene-3,20-dione (IV). Alternately, the 21-organic acid sulfonate (II) can be reacted directly with a metal fluoride salt, e.g., potassium or sodium fluoride, to produce the 21-fluoride directly (IV, V).

The following examples and preparations are illustrative of the process and products of the present invention, but are not to be construed as limiting.

PREPARATION 1

*2-ethoxyoxalyl-6α-methyl-11β,21-dihydroxy-4,17(20)-pregnadien-3-one sodium enolate*

In an atmosphere of nitrogen, 0.76 gram of ethyl oxalate followed by 0.205 gram of sodium methoxide (25 percent solution in methanol) was added to a solution of 1.0 gram of 6α-methyl-11β,21-dihydroxy-4,17(20)-pregnadien-3-one 21-acetate, Spero et al., J.A.C.S. 78, 6213 (1956), in sixteen milliliters of t-butanol. The temperature of addition was 65 degrees centigrade, and the reaction mixture was allowed to stir for a period of ten to fifteen minutes during which period the temperature dropped to 25 degrees centigrade. Sixteen milliliters of ether was added, and stirring was continued for an additional period of thirty minutes. The product, 2-ethoxyoxalyl-6α-methyl-11β,21-dihydroxy-4,17(20)-pregnadien-3-one sodium enolate, was filtered and washed with ether. It was recovered as 1.3 grams of a yellow solid.

PREPARATION 2

*2-ethoxyoxalyl-2α,6α-dimethyl-11β,21-dihydroxy-4,17(20)-pregnadien-3-one*

A reaction mixture was prepared consisting of 1.3 grams of 2 - ethoxyoxalyl-6α-methyl - 11β,21 - dihydroxy-4,17(20)-pregnadien-3-one sodium enolate, 1.5 grams of potassium carbonate, 4.5 milliliters of methyl iodide and thirty milliliters of acetone. The mixture was stirred for 66 hours and was then diluted with 100 milliliters of water and extracted with methylene chloride. The extract was washed with salt water, dried and evaporated to a solid residue. The residual 2-ethoxyoxalyl-2α,6α-dimethyl-11β,21-dihydroxy-4,17(20)-pregnadien-3-one, was obtained as a light-colored, crystalline solid.

PREPARATION 3

2α,6α-dimethyl-11β,21-dihydroxy-4,17(20)-pregnadien-3-one

The 2-ethoxyoxalyl-2α,6α-dimethyl-11β,21-dihydroxy-4,17(20)-pregnadien-3-one obtained as described in Preparation 2 was dissolved in twenty milliliters of methanol and the resulting solution added to 0.8 milliliter of 25 percent sodium methoxide dissolved in methanol. The reaction mixture was stirred under an atmosphere of nitrogen for a period of two hours and was then diluted with 100 milliliters of water and extracted with methylene chloride. The extract was washed with salt water, dried and evaporated, leaving an oily residue of 2α,6α-dimethyl-11β,21-dihydroxy-4,17(20)-pregnadien-3-one.

PREPARATION 4

2α,6α-dimethyl-11β-hydroxy-21-acetoxy-4,17(20)-pregnadien-3-one

The 2α,6α-dimethyl-11β,21-dihydroxy-4,17(20)-pregnadien-3-one obtained according to the method described in Preparation 3 was dissolved in five milliliters of pyridine to which was then added ten milliliters of acetic anhydride. The reaction mixture was permitted to stand for a period of seventeen hours and was then poured into ice water. The resulting oil was extracted with methylene chloride, and the extract washed successively with dilute hydrochloric acid, dilute sodium bicarbonate, and water. The solution was then dried and chromatographed on synthetic magnesium silicate. The column was eluted with five percent acetone-95 percent commercial hexane. Evaporation of the solvent yielded a crystalline residue which was recrystallized from dilute methanol to give pure 2α,6α-dimethyl-11β-hydroxy-21-acetoxy-4,17(20)-pregnadien-3-one, melting point 106 to 108 degrees centigrade; $[\alpha]^{25}$ plus 96 degrees (in chloroform);

$$\lambda_{max}^{alcohol} \ 241 \ m\mu; \ a_M = 14,525$$

*Analysis*—Calculated for $C_{25}H_{36}O_4$: C, 74.96; H, 9.06. Found: C, 74.72; H, 9.10.

PREPARATION 5

2α,6α-dimethyl-11β,17α,21-dihydroxy-4-pregnene-3,20-dione 21-acetate

To a solution of 0.423 gram of 2α,6α-dimethyl-11β-hydroxy-21-acetoxy-4,17(20)-pregnadien-3-one in twenty milliliters of t-butanol was added 2.5 milliliters of pyridine, 1.7 milliliters of 2.15 molar N-methyl-morpholine oxide peroxide and two milligrams of osmium tetroxide. The reaction mixture was stirred at about 22 degrees centigrade for eighteen hours and then concentrated to one-half its volume under reduced pressure. The reaction mixture was then diluted with twenty milliliters of distilled water and extracted with methylene chloride. The extract was washed successively with cold dilute hydrochloric acid, cold sodium bicarbonate, and water, and was then dried and evaporated, leaving 0.44 gram of an oil. The oil was dissolved in forty milliliters of methylene chloride and poured onto a column of fifteen grams of synthetic magnesium silicate. The column was developed with thirty-milliliter fractions of solvent of the following composition and order: five of hexanes (Skellysolve B) plus five percent acetone, five of hexanes plus 7.5 percent acetone, five of hexanes plus ten percent acetone, five of hexanes plus fifteen percent acetone, and five of hexanes plus twenty percent acetone.

The 79 milligrams residue from fractions ten through sixteen was recrystallized twice from a mixture of ethyl acetate and hexanes. There was obtained 33 milligrams of 2α,6α-dimethyl-11β,17α,21-dihydroxy-4-pregnene-3,20-dione 21-acetate, melting point 187 to 193 degrees centigrade. Further recrystallization raises the melting point to 190 to 192 degrees, $[\alpha]_D$ plus 153 degrees in chloroform, $$\lambda_{max}^{alc.} \ 241.5 \ m\mu, \ a_M \ 14,575$$

PREPARATION 6

2α,6α-dimethyl-17α-21-dihydroxy-4-pregnene-3,11,20-trione 21-acetate

A solution was prepared containing one-half milliliter of acetic acid, 25 milligrams of 2α,6α-dimethyl-11β,17α,21-dihydroxy-4-pregnene-3,20-dione 21-acetate, ten milligrams of chromic anhydride and approximately fifty milligrams of distilled water. The mixture was shaken several times at about 22 degrees centigrade and permitted to stand for several hours. The reaction mixture was poured into ten milliliters of water and refrigerated for twenty hours at about five degrees centigrade. The steroid product which crystallized from the aqueous mixture was collected and recrystallized twice from acetone to give light-colored crystals of 2α,6α-dimethyl-17α,21dihydroxy-4-pregnene-3,11,20-trione 21-acetate.

PREPARATION 7

2α,6α-dimethyl-11β,17α,21-dihydroxy-4-pregnene 3,20-dione

A solution of 5.3 grams (12.2 millimoles) of 2α,6α-dimethyl-11β,17α,21-dihydroxy-4-pregnene-3,20-dione 21-acetate in 500 milliliters of methanol was purged of oxygen by bubbling nitrogen through the solution for five minutes. A solution of 2.7 grams of potassium bicarbonate in fifty milliliters of water, similarly freed of oxygen, was added with stirring. After five hours, 3.5 milliliters of acetic acid and 75 milliliters of water was added and the solution concentrated at reduced pressure until it became cloudy. At this point it was saturated with sodium chloride and extracted with methylene chloride. The extract was dried by filtering through sodium sulfate and evaporated to yield 5.0 grams of colorless glass. Crystallization from a mixture of ethyl acetate and hexanes (Skellysolve B) gave colorless flakes of 2α,6α - dimethyl - 11β,17α,21-dihydroxy-4-pregnene-3,20-dione melting at 199 to 201 degrees centigrade. A recrystallization from the same solvent gave prisms melting at 188 to 191 degrees centigrade, having an $[\alpha]_D$ plus 156 degrees in chloroform and a $$\lambda_{max}^{alc.} \ 241 \ m\mu, \ a_M \ 14,400 \ \text{and the analysis below}$$

*Anal.*—Calculated for $C_{23}H_{34}O_5$: C, 70.74; H, 8.78. Found: C, 70.26; H, 8.81.

PREPARATION 8

2α,6α-dimethyl-17α,21-dihydroxy-4-pregnene-3,11,20-trione

Following the procedure of Preparation 7 exactly, but substituting 2α,6α-dimethyl-17α,21-dihydroxy-4-pregnene-3,11,20-trione 21-acetate as the starting steroid, there was produced 2α,6α - dimethyl-17α,21-dihydroxy-4-pregnene-3,11,20-trione.

EXAMPLE 1

2α,6α-dimethyl-11β,17α-dihydroxy-21-fluoro-4-pregnene-3,20-dione

A solution of 1.66 grams (4.2 millimoles) of 2α,6α-dimethyl - 11β,17α,21 - trihydroxy-4-pregnene-3-20-dione in ten milliliters of pyridine was cooled to zero degrees centigrade and 0.6 milliliter of methanesulfonyl chloride was added with swirling. The mixture was kept at zero to five degrees centrigrade for two hours and then poured into a mixture of 6.5 milliliters of concentrated hydrochloric acid, 65 milliliters of water and ice. The solid 2α,6α-dimethyl-11β,17α,21-trihydroxy-4-pregnene - 3,20-dione 21-methanesulfonate was collected by filtration, washed with water and air dried. The crude mesylate thus-obtained was dissolved in twenty milliliters of dimethyl sulfoxide, 1.0 grams of anhydrous potassium fluoride was added and the mixture stirred overnight on a steam bath. After cooling, 100 milliliters of water was added and the mixture extracted with three 25-milliliter portions of methylene chloride. The combined extracts were washed with water, dried by filtering through sodium sulfate and concentrated to approximately one half volume. This solution was poured directly onto a column of 100 grams of magnesium silicate (Florisil). The column was developed and the eluate was collected in 200-milliliter fractions of the following composition: five of hexanes (Skellysolve B) plus five percent acetone; five of hexanes plus seven percent acetone; five of hexanes plus ten percent acetone; five of hexanes plus fifteen percent acetone; five of hexanes plus twenty percent acetone; and finally acetone. Fractions 14 through 19 were combined and the residue, after the solvent was removed, was recrystallized from a mixture of hexanes and acetone to give 0.14 gram of 2α,6α-dimethyl-11β,17α-dihydroxy-21-fluoro-4-pregnene-3,20-dione as prisms melting at 235 to 244 degrees centigrade. A second 0.12 gram crop melting at 232 to 236 degrees was obtained. The first crop had an $[α]_D$ plus 166 degrees in chloroform, a $λ_{max.}^{alc.}$ 241 m$μ$, $a_M$ 14,675 and the analysis below

*Anal.*—Calculated for $C_{23}H_{33}O_4F$: C, 70.38; H, 8.47; F, 4.84. Found: C, 70.42; H, 8.88; F, 4.34.

Fractions six to nine contained 2α,6α-dimethyl-11β-hydroxy-17α,21-epoxy-4-pregnene-3,20-dione as a second reaction product. This compound also possesses anti-inflammatory and diuretic activity.

EXAMPLE 2

*2α,6α-dimethyl-17α-hydroxy-21-fluoro-4-pregnene-3,11,20-trione*

Following the procedure of Example 1, but substituting 2α,6α-dimethylcortisone as the starting compound, there was produced 2α,6α-dimethyl - 17α - hydroxy-21-fluoro-4-pregnene-3,11,20-trione and 2α,6α-dimethyl-17α,21-epoxy-4-pregnene-3,11,20-trione, the latter compound coming off the column before the former.

EXAMPLE 3

*2α,6α-dimethyl-17α-hydroxy-21-fluoro-4,9(11)-pregnadiene-3,20-dione*

A reaction mixture was prepared by dissolving 500 milligrams of 2α,6α - dimethyl - 11β,17α-dihydroxy-21-fluoro-4-pregnene-3,20-dione in five milliliters of pyridine and adding 225 milligrams of N-bromoacetamide in an atmosphere of nitrogen. The mixture was maintained at about 22 degrees centigrade under nitrogen for a period of thirty minutes. It was then cooled to ten to fifteen degrees centigrade and sulfur dioxide gas was passed over the surface while shaking the mixture until the solution gave no color with acidified starch-iodine paper. The temperature was kept below thirty degrees centigrade during the addition. After standing at room temperature for a period of fifteen minutes, the reaction mixture was poured into ice water and the resulting precipitate extracted with fifty milliliters of ether. The ether extract was washed successively with dilute hydrochloric acid and water, dried and evaporated to a solid residue. The residue, 2α,6α - dimethyl - 17α - hydroxy-21-fluoro-4,9(11)-pregnadiene-3,20-dione, was purified by recrystallization from a mixture of acetone and hexane.

EXAMPLE 4

*2α,6α-dimethyl-9α-bromo-11β,17α-dihydroxy-21-fluoro-4-pregnene-3,20-dione*

A reaction mixture was prepared by dissolving 330 milligrams of 2α,6α-dimethyl-17α-hydroxy-21-fluoro-4,9(11)-pregnadiene-3,20-dione in five milliliters of methylene chloride and ten milliliters of t-butanol, and adding a solution of 0.83 milliliter of 72 percent perchloric acid dissolved in 5.8 milliliters of water. To the mixture was then added a solution of 142 milligrams of N-bromoacetamide dissolved in 2.5 milliliters of t-butanol. The reaction mixture was stirred for fifteen minutes and then a solution of 142 milligrams of sodium sulfite dissolved in seven milliliters of water was added and the reaction mixture was concentrated to a volume of about 25 milliliters under reduced pressure at about sixty degrees centigrade. The concentrated mixture was cooled in an ice bath with stirring and fifty milliliters of water was added, whereupon the crystalline product, 2α,6α-dimethyl-9α-bromo-11β,17α - dihydroxy - 21 - fluoro - 4 - pregnene - 3,20-dione 21-acetate, separated as a light-colored crystalline solid.

EXAMPLE 5

*2α,6α-dimethyl-9β,11β-epoxy-17α-hydroxy-21-fluoro-4-pregnene-3,20-dione*

A reaction mixture was prepared by dissolving 400 milligrams of 2α,6α - dimethyl - 9α - bromo - 11β,17α-dihydroxy-21-fluoro-4-pregnene-3,20-dione in fifty milliliters of acetone and adding 400 milligrams of potassium acetate. The resulting suspension was heated under reflux for a period of eighteen hours and the mixture then concentrated to a volume of five milliliters on the steam bath. Ten milliliters of water was added to the mixture and the resulting crystalline product was separated by filtration and recrystallized from acetone to give light-colored crystals of 2α,6α-dimethyl-9β,11β-epoxy-17α-hydroxy-21-fluoro-4-pregnene-3,20-dione.

EXAMPLE 6

*2α,6α-dimethyl-9α,21-difluoro-11β,17α-dihydroxy-4-pregnene-3,20-dione*

A solution of 230 milligrams of 2α,6α-dimethyl-9β,11β-epoxy - 17α - hydroxy - 21 - fluoro - 4 - pregnene - 3,20-dione in two milliliters of methylene chloride was added to a solution of 1.2 milliliters of anhydrous solution of hydrogen fluoride in 2.3 milliliters of tetrahydrofuran at minus sixty degrees centigrade. The reaction mixture was stirred for a period of twenty hours while cooling to about minus thirty degrees and then diluted with fifteen milliliters of methylene chloride and poured into a mixture of forty milliliters of distilled water and four grams of sodium bicarbonate. The methylene chloride phase was separated and the water phase extracted with fresh methylene chloride. The methylene chloride solutions were combined, dried, diluted with 25 milliliters of ether and adsorbed on a column of synthetic magnesium silicate. The column was eluted with a methylene chloride-ether (3:1) mixture followed by successive portions of hexane containing progressively increasing amounts of acetone (ranging from ten to fifty percent). The fractions eluted by hexane mixtures containing up to twenty percent acetone were combined, evaporated to a solid residue and the residue recrystallized from a mixture of acetone and hexane followed by a further recrystallization from methylene chloride to give pure 2α,6α-dimethyl-9α,21 - difluoro - 11β,17α - dihydroxy - 4 - pregnene-3,20-dione as a light-colored crystalline product.

EXAMPLE 7

*2α,6α-dimethyl-9α,21-difluoro-17α-hydroxy-4-pregnene-3,11,20-trione*

Following the procedure of Preparation 6 exactly, but substituting 2α,6α - dimethyl - 9α,21 - difluoro - 11β,17α-dihydroxy-4-pregnene-3,20-dione as starting steriod, there was produced 2α,6α - dimethyl - 9α,21 - difluoro - 17α-hydroxy-4-pregnene-3,11,20-trione.

EXAMPLES 8 THROUGH 11

*1-dehydrogenation with Septomyxa affinis*

Three 400-milliliter portions of glucose-corn steep liquor medium having a pH of 4.6 and containing 1.0 gram of glucose and 2.0 grams of corn steep liquor solids per 100 milliliters, were inoculated with *Septomyxa affinis*, ATCC 6737, and incubated in shaken flasks at room temperature for 48 hours. During this period a heavy fungal growth developed. Twenty-four liters of the same medium, to which was added twenty milliliters of lard oil containing 0.1 percent octadecanol as defoamer, was inoculated with the combined volume of 1200 milliliters of medium containing the fungal growth. Incubation of the resulting mixture was carried out at 28 degrees centigrade with constant agitation and aeration for a period of 24 hours whereupon the medium was divided into four equal portions labeled A through D. To portion A was slowly added 500 milligrams of 2α,6α - dimethyl-11β,17α - dihydroxy - 21 - fluoro - 4 - pregnene - 3,20-dione dissolved in sixty milliliters of propylene glycol. To portion B was slowly added 500 milligrams of 2α,6α-dimethyl - 17α - hydroxy - 21 - fluoro - 4 - pregnene-3,11,20-trione dissolved in sixty milliliters of propylene glycol. To portion C was slowly added 500 milligrams of 2α,6α - dimethyl - 9α,21 - difluoro - 17α - hydroxy - 4-pregnene-3,11,20-trione dissolved in sixty milliliters of propylene glycol. To portion D was slowly added 500 milligrams of 2α,6α - dimethyl - 9α,21 - difluoro - 11β,17α-dihydroxy-4-pregnene-3,20-dione dissolved in sixty milliliters of propylene glycol. Fermentation of the four portions was continued for three days after which time the beers were extracted with chloroform under reflux. The extract of each portion was cooled and evaporated to a solid residue and the residue dissolved in 500 milliliters of ethylene dichloride. The solution was then separated chromatographically on synthetic magnesium silicate. The adsorbed material was eluted with successive portions of ethylene dichloride containing increasing amounts of acetone up to a 50:50 mixture at the eighteenth portion. The eluate portions containing approximately ten percent acetone were evaporated to a solid residue containing, respectively, for portion A, 2,6α - dimethyl - 11β,17α - dihydroxy - 21 - fluoro - 1,4 - pregnadiene - 3,20 - dione; portion B, 2,6α - dimethyl - 17α - hydroxy - 21 - fluoro-1,4 - pregnadiene - 3,11,20 - trione; portion C, 2,6α - dimethyl - 9α,21 - difluoro - 17α - hydroxy - 1,4 - pregnadiene - 3,11,20 - trione; and portion D, 2,6α - dimethyl-9α,21 - difluoro - 11β,17α - dihydroxy - 1,4 - pregnadiene-3,20-dione.

It is to be understood that the invention is not to be limited to the exact details of operation or exact compounds shown and described, as obvious modifications and equivalents will be apparent to one skilled in the art, and the invention is therefore to be limited only by the scope of the appended claim.

We claim:

2α,6α - dimethyl - 11β,17α - dihydroxy - 21 - fluoro - 4-pregnene-3,20-dione.

References Cited in the file of this patent

UNITED STATES PATENTS

| | | |
|---|---|---|
| 2,763,671 | Fried et al. | Sept. 18, 1956 |
| 2,831,003 | Thomas | Apr. 15, 1958 |
| 2,867,631 | Lincoln et al. | Jan. 6, 1959 |
| 2,867,634 | Lincoln et al. | Jan. 6, 1959 |
| 2,903,449 | Fried et al. | Sept. 8, 1959 |

OTHER REFERENCES

Spero et al.: J. Am. Chem. Soc., vol. 79 (March 20, 1957), pages 1515 and 1516.